(12) United States Patent
Meeusen

(10) Patent No.: US 8,774,416 B2
(45) Date of Patent: Jul. 8, 2014

(54) RECEIVER

(75) Inventor: Rafael Jan Jozef Meeusen, Leuven (BE)

(73) Assignee: NXP, B.V., Eindhoven (NL)

( * ) Notice: Subject to any disclaimer, the term of this patent is extended or adjusted under 35 U.S.C. 154(b) by 2138 days.

(21) Appl. No.: 10/535,060

(22) PCT Filed: Oct. 27, 2003

(86) PCT No.: PCT/IB03/04817
§ 371 (c)(1),
(2), (4) Date: May 13, 2005

(87) PCT Pub. No.: WO2004/047488
PCT Pub. Date: Jun. 3, 2004

(65) Prior Publication Data
US 2006/0078128 A1   Apr. 13, 2006

(30) Foreign Application Priority Data
Nov. 19, 2002 (EP) .................................... 02079809

(51) Int. Cl.
*H04H 20/48* (2008.01)
*H04H 20/49* (2008.01)

(52) U.S. Cl.
USPC ................................................ 381/3; 381/15

(58) Field of Classification Search
CPC ..... H04H 40/45; H04H 40/36; H04B 1/1646;
H04B 1/1669; H04B 1/1676; H04B 1/1684
USPC .......................... 381/4, 7, 13, 2; 455/309, 337
See application file for complete search history.

(56) References Cited

U.S. PATENT DOCUMENTS

| 4,630,299 | A | 12/1986 | Welles, II et al. |
| 5,327,132 | A | 7/1994 | Whitecar et al. |
| 5,604,808 | A | 2/1997 | Takeda et al. |
| 7,149,312 | B1 * | 12/2006 | Wildhagen ........................ 381/2 |

FOREIGN PATENT DOCUMENTS

| CN | 2274854 Y | 2/1998 |
| CN | 2324710 Y | 6/1999 |
| EP | 0 512 606 B1 | 7/1996 |
| EP | 1 071 203 A1 | 1/2001 |

* cited by examiner

*Primary Examiner* — Ping Lee

(57) ABSTRACT

The invention refers to a method for a receiver (1) having a signal path (3) incorporating a tuner (4), a frequency demodulator circuit (5) for supplying an analog stereo multiplex signal comprising a baseband stereo sum signal, a 19 kHz stereo pilot and a stereo difference signal, which is double sideband amplitude-modulated on a suppressed 38 kHz subcarrier, a sampler (6) for converting the analog stereo multiplex signal into a time discrete digital stereo multiplex signal and a stereo decoder (7) for decoding the time discrete digital stereo multiplex signal into a time-discrete digital stereo sum and a time discrete digital stereo difference signal. According to the invention the analog stereo multiplex signal is converted into a time discrete digital stereo multiplex signal and then the time discrete digital stereo multiplex signal is shifted over a frequency of 19 kHz to extract the pilot tone.

4 Claims, 3 Drawing Sheets

RECEIVER

Figure 1:
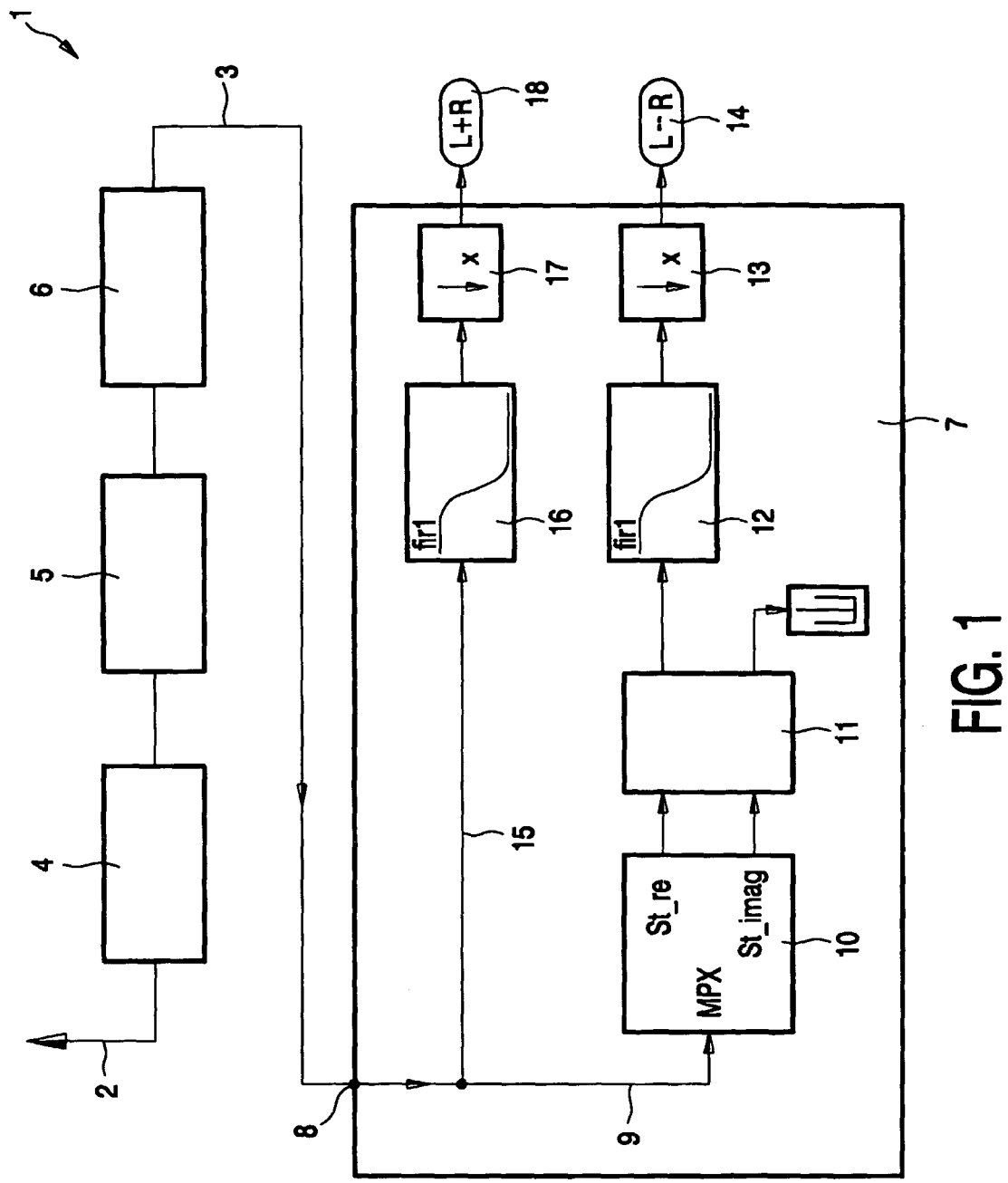

The invention relates to a method for a receiver, a receiver and a stereo decoder for a receiver having a signal path incorporating a tuner, a frequency demodulator circuit for supplying an analog stereo multiplex signal comprising a baseband stereo sum signal, a 19 kHz stereo pilot and a stereo difference signal, which is double sideband amplitude-modulated on a suppressed 38 kHz subcarrier, a sampler for converting the analog stereo multiplex signal into a time discrete digital stereo multiplex signal and the stereo decoder for decoding the time discrete digital stereo multiplex signal into a time-discrete digital stereo sum and a time discrete digital stereo difference signal.

In a frequency modulated stereo multiplex signal, the stereo signal is double side band with suppressed carrier, DSB-SC for short, modulated on a 38 kHz carrier. A 19 kHz pilot tone in the multiplex signal is used to reconstruct the carriers phase and frequency for the demodulation. As a consequence of the double side band with suppressed carrier, the same stereo information is present in both, the lower side band from 23-38 kHz and the upper side band from 38-53 kHz. However, after frequency modulated transmission and demodulation, the noise power spectral density is a rapidly increasing function of frequency, i.e. the noise is much higher in the upper side band than in the lower side band. Therefore a stereo decoder that uses only the lower side band stereo information, will have a better performance.

For achieving this, a halfband filter with a finite impulse response, FIR halfband filter for short, with perfect anti-symmetrical amplitude response around exactly 38 kHz can be used, such that the upper and lower side band perfectly reconstruct the stereo signal when they fold together, even though most of the upper side band is suppressed. The 38 kHz mentioned must of course be phase-locked to the 19 kHz pilot tone in the stereo multiplex signal.

In order to obtain a digital filter with perfect symmetry around 38 kHz, two possible solutions are described in EP 05 12 606 B1 and EP 02 075 981, which is not published yet. In EP 05 12 606 B1 it is solved by phase-locking a sample frequency of an analog digital converter on a multiple of 38 kHz, such that an ordinary FIR halfband filter with −6 dB at a half of the sampling frequency, F√2 for short, will do. In EP 02 075 981 it is solved by complex modulating the stereo multiplex signal to direct current, followed by a complex halfband FIR with −6 dB at direct current.

It is an object of the invention to present a simple method for a receiver, a simple receiver and a simple stereo decoder for a receiver decoding the time discrete digital stereo multiplex signal.

This object is solved with the features of the coordinated claims 1, 5 or 9. The analog stereo multiplex signal is converted into a time discrete digital stereo multiplex signal and then the time discrete digital stereo multiplex signal is shifted over a frequency of 19 kHz. This means that after the shifting the pilot tone lies in DC and is ready to be extracted by a low pass filter supplying a phase locked loop.

Advantageously the 19 kHz shifted signal is further shifted with 19 kHz. That means, that the double sideband of the amplitude modulated signal lies with its middle at DC and from the signal shifted twice the stereo difference signal will be extracted by a decimation filter. Only with two frequency shiftings the pilot tone and the stereo difference signal are ready to be extracted and then to be supplied.

Advantageously in front of the decimation filter a lower sideband of the stereo difference signal is extracted from the signal shifted twice by a complex filter. If the complex filter is left out, and immediately after modulation only the real part is used, the both side bands of the stereo signal fold together resulting in an ordinary DSB-SC demodulation. Therefore, the same receiver can be used for both an ordinary stereo decoder, where both side bands are used, and a better stereo decoder that only uses the lower side band. The only difference in the receiver is the complex filter. In software, this complex filter can be regarded as an upgrade, if it is added, more million instructions per second, MIPS for short, are required, but the audio quality is higher.

Advantageously the stereo sum signal is extracted from the time discrete digital stereo multiplex signal in a parallel branch by a second decimation filter. The decimation filter in both branches, one for the decoding of the stereo sum signal and one for the decoding of the stereo difference signal are identically.

Figure 2:
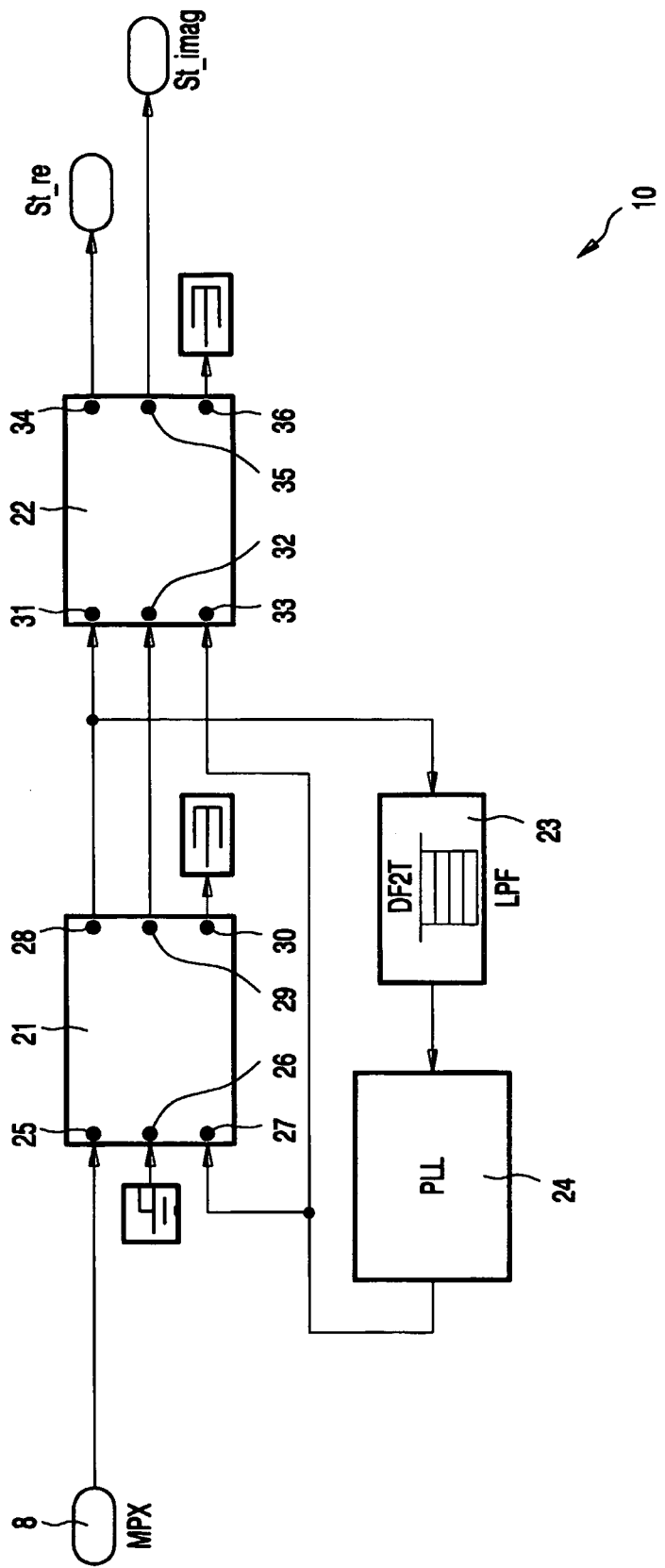
Figure 3:
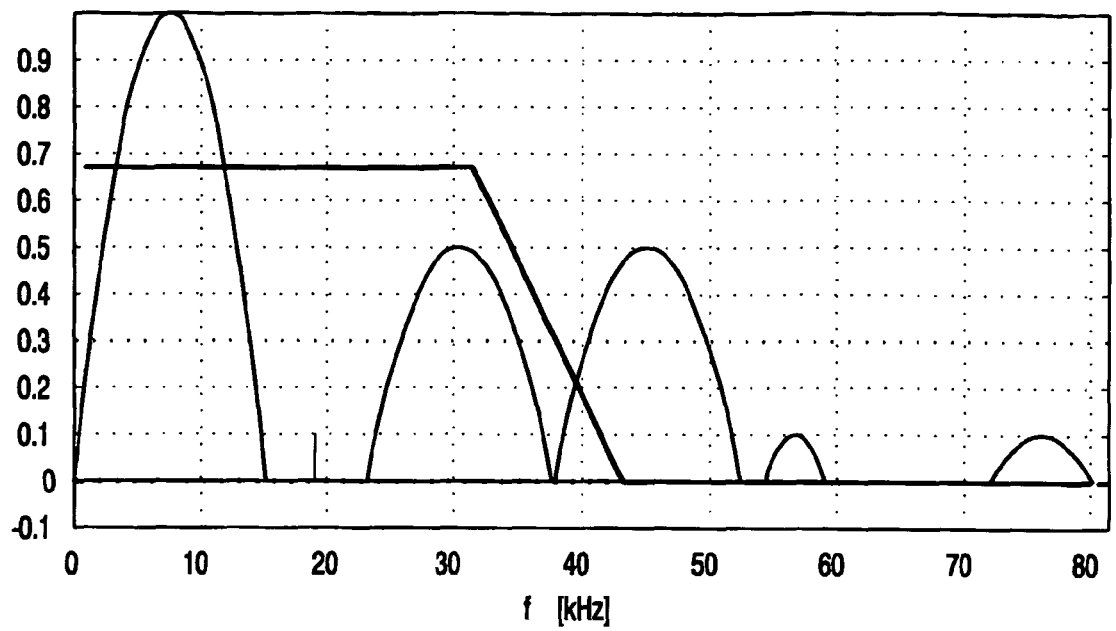
Figure 4:
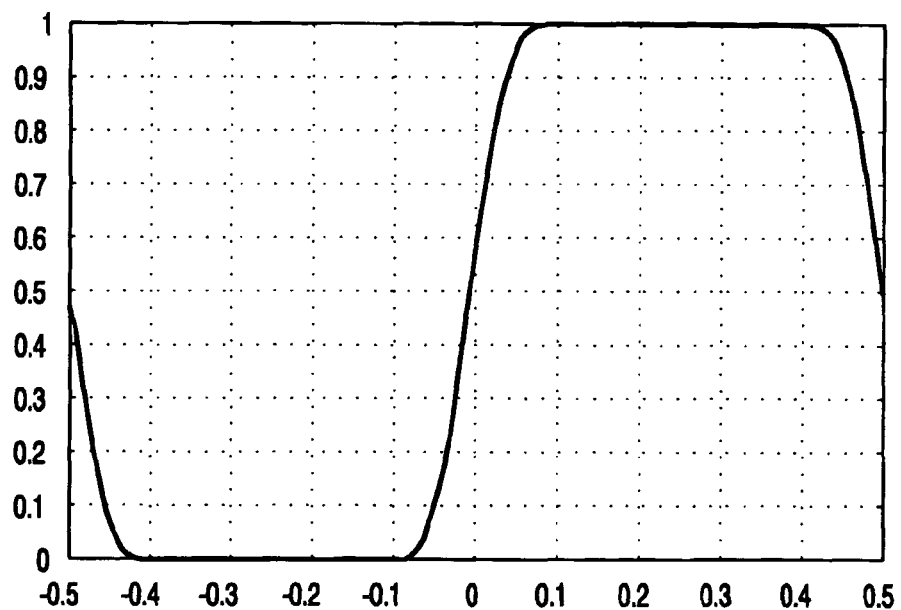

An embodiment according to the invention will now be described with reference to a drawing, in which:

FIG. 1 shows a block diagram of a receiver,
FIG. 2 shows a block diagram of a stereo decoder,
FIG. 3 shows a diagram with a stereo multiplex signal and a filter curve, and
FIG. 4 shows a complex halfband filter amplitude response.

FIG. 1 shows a receiver 1 with an antenna 2. The receiver 1 has a signal path 3 incorporating a tuner 4, a frequency demodulator circuit 5 for supplying an analog stereo multiplex signal comprising a baseband stereo sum signal, also called mono signal L+R, a 19 kHz stereo pilot tone and a stereo difference signal, also called stereo signal L−R, which is double sideband amplitude-modulated on a suppressed 38 kHz subcarrier, an A/D converter 6, sampler for short, for converting the analog stereo multiplex signal into a time discrete digital stereo multiplex signal and a stereo decoder 7 for decoding the time discrete digital stereo multiplex signal into a time-discrete digital stereo sum and a time discrete digital stereo difference signal. The A/D converter 6 supplies the time discrete digital stereo multiplex signal, time discrete digital MPX for short, to the stereo decoder 7 via input 8. The stereo decoder 7 comprises a first signal branch 9 incorporating a second demodulator 10, a complex filter 11, a low pass decimation filter 12, extracting the stereo signal L−R, a downsampler 13 and an output 14. The output 14 supplies the time discrete digital stereo difference signal L−R. The stereo decoder 7 comprises a second parallel signal branch 15 incorporating a second low pass decimation filter 16, extracting the mono signal L+R, a second downsampler 17, and a second output 18. The second output 18 supplies the time discrete digital stereo sum signal L+R.

FIG. 2 shows the second demodulator 10, which comprises a first frequency shifting circuit 21, also called phase rotator circuit and a second frequency shifting circuit 22, also called phase rotator circuit, a low pass filter 23, LPF for short, and a phase locked loop 24, PLL for short. The phase rotators circuits 21 and 22, phase rotators for short, are serial and identically implemented. The first phase rotator 21 comprises three inputs 25-27 defining input signals x_in, y_in and z_in and three outputs 28-30 defining output signals x_out, y_out and z_out and the second phase rotator 22 comprises three inputs 31-33 also defining input signals x_in, y_in and z_in and three outputs 34-36 also defining output signals x_out, y_out and z_out. The input 25 is supplied with the MPX signal. The input 26 is supplied with logic zero, the input 27 and 33 are supplied with the phase signal of the phase locked loop. The outputs 28 and 29 are connected with the inputs 31 and 32. The low pass filter 23 is connected to the output 28. The both outputs 34 and 35 are connected to the complex filter 10 and supply a real and a imaginary stereo signal. The outputs 30 and 36 are not used. The PLL 24 supplies the inputs 27 and 33.

FIG. 3 shows the MPX signal and a curve of a halfband filter with −6 db at 38 kHz FIG. 4 shows an amplitude response of a complex halfband filter.

The function of the stereo decoder 7 can be described as follows:

The MPX signal at the input 8 is supposed to be sampled at 106 kHz or higher, such that the stereo signal frequencies until 53 kHz are present. The mono signal is extracted by decimating the MPX signal with factor X to the desired audio sample rate. An extra low pass filter, not shown, is needed at the end of the branch 15 to remove pilot tone leftovers. The decimation filter 16 can in principle be any kind of decimation filter and is not necessarily an FIR filter. The stereo signal L−R is obtained by demodulating the MPX signal from −38 kHz to direct current, which corresponds to a frequency shift over +38 kHz, followed by a complex filtering and then by exactly the same decimation and filtering as for the mono signal L+R. Direct current, DC for short, means, that there is no frequency or the frequency is nil. If there is a frequency shift over 38 kHz, the double sideband of the stereo difference signal is with its middle in DC.

The MPX signal is shifted over +38 kHz using complex phase rotators 21 and 22. The shifted MPX signal is a complex signal with the lower side band of the stereo signal at frequency interval from 0-15 kHz, and with the upper side band of the stereo signal at negative frequencies −15-0 kHz. The complex filter 11 is a shifted halfband filter with −6 dB at DC, suppressing the negative frequencies and passing the positive frequencies.

FIG. 4 shows the amplitude response of the complex halfband filter 11 from $-F_s/2$ to $F_s/2$ on a linear scale. When applied to the shifted MPX signal resulting in an operation similar to the filter shown in FIG. 3.

The same result is obtained by shifting over −38 kHz and filtering with a shifted halfband filter that suppresses the positive frequencies. After taking the real part, positive and negative frequencies fold together anyway.

The shifting is done in two stages of +19 kHz, such that a PLL 24 can lock on the 19 kHz pilot tone, which is at DC after the first phase rotator 21. The LPF 23 suppresses the audio components in the PLL loop, since these are noise with regards to the pilot tone at DC. The output signal of the PLL 24 is a sawtooth signal at 19 kHz, locked on the pilot tone. The operation of the phase rotators 21 and 22 is described by $$x\_out = x\_in \cos(\pi z\_in) - y\_in \sin(\pi z\_in)$$

$$y\_out = y\_in \cos(\pi z\_in) + x\_in \sin(\pi z\_in)$$

or in complex notation:

$$(x\_out + j\, y\_out) = (x\_in + j\, y\_in) e^{j\pi z\_in}$$

That means a complex modulation or in other words a frequency shifting of the input signal with the frequency of the z_in signal. The phase rotators 21 and 22 are micro Processors, µProcessors for short, in which vectors in the complex plane are rotated over a given angle. The phase rotators 21 and 22, which are in the complex domain, are identically implemented. All the other filters 12, 13, 16 and 17 are in the real domain. The decimation chains with filters 12, 13, 16 and 17 for the mono and the stereo signal are identical, so the same filter coefficients are used. If the complex filter 11 is left out, and immediately after modulation only the real part is used, the both side bands of the stereo signal fold together resulting in an ordinary DSB-SC demodulation. Therefore, the same block diagram can be used for both an ordinary stereo decoder, where both side bands are used, and a better stereo decoder that only uses the lower side band. The only difference in the block diagram is the complex filter 11. In software, this complex filter can be regarded as an upgrade, if it is added, more million instructions per second, MIPS for short, are required, but the audio quality is higher.

The invention claimed is:

1. Method for a receiver having a signal path incorporating a tuner, a frequency demodulator circuit for supplying an analog stereo multiplex signal comprising a baseband stereo sum signal, a 19 kHz stereo pilot and a stereo difference signal, which is double sideband amplitude-modulated on a suppressed 38 kHz subcarrier, a sampler for converting the analog stereo multiplex signal into a time discrete digital stereo multiplex signal and a stereo decoder for decoding the time discrete digital stereo multiplex signal into a time-discrete digital stereo sum and a time discrete digital stereo difference signal, wherein the analog stereo multiplex signal is converted into a time discrete digital stereo multiplex signal and then the time discrete digital stereo multiplex signal is shifted over a frequency of 19 kHz to extract at least one of the time-discrete digital stereo sum and the time discrete digital stereo difference signal.

2. Method as claimed in claim 1, wherein the 19 kHz shifted signal is further shifted with 19 kHz and then the stereo difference signal is extracted by a low pass filter.

3. Method as claimed in claim 2, wherein in front of the low pass filter a lower sideband of the stereo difference signal is extracted by a complex filter from the signal shifted twice.

4. Method as claimed in claim 1, wherein the time discrete digital stereo multiplex signal is shifted over a of 19 kHz to extract the time discrete digital stereo difference signal, and wherein the time discrete digital stereo sum signal is extracted from the time discrete digital stereo multiplex signal in a parallel branch by a second low pass filter.

* * * * *